Sept. 22, 1936.  A. B. GAUTHIER  2,055,217
AERIAL PROJECTION
Filed Feb. 11, 1932
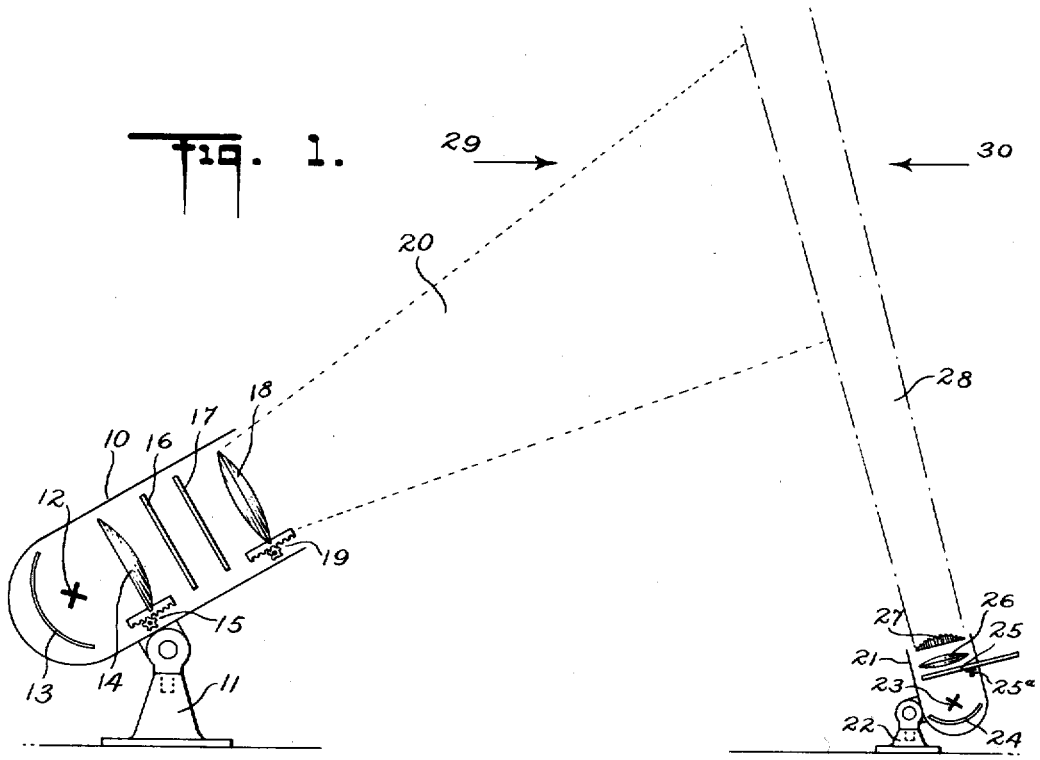
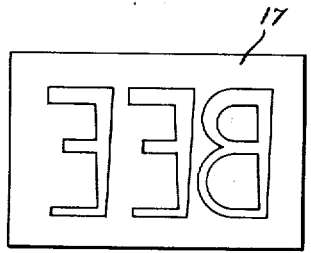
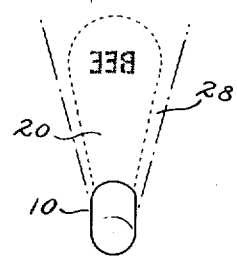
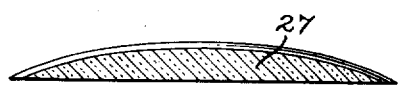
INVENTOR
Alfred B. Gauthier
BY
ATTORNEYS Patented Sept. 22, 1936

2,055,217

UNITED STATES PATENT OFFICE 2,055,217

AERIAL PROJECTION

Alfred B. Gauthier, New York, N. Y., assignor, by direct and mesne assignments, to Adverlite, Inc., a corporation of New York Application February 11, 1932, Serial No. 592,263

8 Claims. (Cl. 88—24)

This invention relates to aerial projection and, with regard to the most specific features thereof, to the formation of a visible intelligible image independently of a tangible surface.

One of the objects thereof is to provide practical apparatus for projection of the above nature which shall be of simple and effective construction. Another object is to provide apparatus of the above nature of efficient and reliable action. Another object is to provide apparatus of the above nature in which the light is economically used and which is adapted for long range action under practical working conditions. Another object is to provide an effective and practical art for accomplishing aerial projection of the above nature. Other objects will be in part obvious and in part pointed out hereafter.

The invention accordingly consists in the features of construction, combination of elements, arrangement of parts and in the several steps and relation and order of the steps all as will be illustratively set forth in the following description and the scope of the application of which will be indicated in the following claims.

In the accompanying drawing, in which is shown one of the various possible embodiments of this invention, Figure 1 is a diagrammatic side elevation of the apparatus in action;

Figure 2 is a partial diagrammatic end view of the subject matter of Figure 1 viewed from the lefthand side and on a smaller scale;

Figure 3 is a cross-section of a lens;

Figure 4 is a side elevation of the lens shown in Figure 3; and

Figure 5 is a front view of a stencil.

Similar reference characters refer to similar parts throughout the several views of the drawing.

Referring now to the apparatus shown in Figure 1 of the drawing, there is shown at 10 a projector mounted for universal swinging movement upon a support 11. This projector comprises a source of light 12 preferably in the form of a direct current arc with suitable means to control the current flowing therethrough. At the rear of the source of light is a reflector 13 of a suitable form to coact therewith and throw the reflected light as well as the direct rays through the condenser lens 14 which is adjustable of the axis of the projector as indicated diagrammatically at 15. The rays, passing in substantially parallel form from the lens 14, traverse a color filter 16 which is of such material as to permit the transmission of rays of a pure predetermined color and substantially exclude all others. At 17 is suitably mounted a stencil, the construction of which will later be described but it may here be noted that this stencil limits the rays passing therethrough to those having a predetermined cross-section. At 18 is an object lens adjustably mounted in a direction longitudinally of the projector as by means diagrammatically illustrated at 19.

The resultant beam 20 will be of high intensity and of a substantially pure predetermined color. Also, it will have a predetermined cross-section corresponding to the stencil 17. This beam will be divergent to a slight extent so as to throw to a very considerable distance without undue loss of intensity and yet give an image of the desired size.

At 21 is a projector also mounted for universal adjustment upon the support 22. This projector is provided with a source of light 23 and suitable reflector 24 which may be of parabolic form with the source of light at the axis of the parabola. The rays pass first through a color filter 25, similar in action to the color filter 16 and preferably rotatable as about the axis 25ᵃ so as to vary at will the color of the transmitted light. In front of this filter is interposed a biconvex lens 26 coacting with the remaining portions of this projecting apparatus to attain the results hereinafter set forth.

At 27 is a lens of the so-called fan-light type, the cross-section of which is diagrammatically indicated in Figure 3 and the longitudinal elevation of which appears in Figure 4. This lens, which in itself is of a well known form, with suitable longitudinal prisms, throws a sheet of light which is of substantially uniform thickness but which diverges laterally in fan-shaped form, as indicated in Figure 2 of the drawing by the beam 28. As this beam is diagrammatically indicated in Figure 1 of the drawing it appears to be of exaggerated thickness, but in that figure it is viewed edgewise and its thickness is of a low value as compared with its lateral dimension as shown in Figure 2. This beam of light is of a different color than the beam 20, and accordingly the intersection is formed in a third color. For example, if one of these beams were yellow and the other blue, the intersection would be of a greenish color and readily distinguishable from either. It is to be noted, however, that one of these beams may be white, in which case if the other beam were red the third color would be pink.

The stencil is preferably so arranged as to throw the symbol in reverse form upon the beam 28; that is, the symbol would be reversed as viewed from the direction indicated by the arrow 29. A stencil of this form is shown in Figure 5 of the drawing in which the word "Bee" is shown reversed. This, however, will appear in proper form when viewed from the direction of the arrow 30, and will be seen more clearly than when the line of vision traverses the beam 20 if the image were looked at from the direction of the arrow 29.

It is also to be noted that when the angle between the beams is relatively sharp, the lower portion of the beam 20 travels a less distance than the upper portion. This would occur when the beam 28 is substantially vertical and the projector 10 at no great distance from the projector 21. This effect would be present to some extent even with the wide angle shown in Figure 1 of the drawing, and accordingly the stencil is suitably shaped as indicated in Figure 5 of the drawing so as to increase the dimensions of the cross-section of the lower part as compared with the upper part. This will then give an appearance of uniform dimensions in the image as viewed from the direction of the arrow 30, for the divergent rays passing through the upper portion of the stencil will have a greater distance in which to diverge. It is to be understood, however, that this distortion is relatively small and that for best focusing of the image the plane of the sheet should be as nearly transverse of the beam as is practicable.

In the action of the apparatus the stencil may be changed at will and the color of either or both beams varied at will, and in this manner an image is formed which is visible from great distances. It is also to be understood that the lenses, particularly of the projector 10, are so adjusted and focused as to focus the image exactly upon the plane in which the fan-light beam 28 lies. By this focusing at the proper plane the clarity of the image is greatly enhanced and it is rendered visible from much greater distances. It is also to be understood that the use of proper color filters is an important factor in securing the desired results.

It will thus be seen that there is provided apparatus and an art in which the several objects of this invention are achieved and which are well suited to meet the conditions of practical use in the outer air.

As various changes could be made in the apparatus herein described and as the herein described art could be carried on with other forms of apparatus, all matter herein set forth or shown in the accompanying drawing is to be interpreted as illustrative and not in a limiting sense.

I claim:

1. In apparatus of the general nature of that herein described, in combination, a projector having a light source, a plano-convex lens mounted on said projector having corrugations formed on its convex side whereby the beam from said light source is projected in a fan-like sheet, a color filter positioned across said beam, a second projector, a translucent object mounted on said second projector, a distorted image formed on said object, and a color filter of a different color than said first-mentioned color filter positioned adjacent said object, the distortion of said image being such as to be rectified by the angle of incidence of said light beams when viewed from a direction substantially at right angles to the plane of said fan-like sheet upon which said image is superimposed.

2. In apparatus of the general nature of that herein described, in combination, a source of light, a lens having corrugations thereon running substantially parallel to the transverse axes thereof and adapted to throw light from said source in a segmental sheet of substantially uniform thickness, means adapted to project a beam of light of a predetermined cross-section intersecting said sheet and of a different color from that of said sheet, an object through which said beam is thrown, and means adapted to focus the image of said object upon said sheet.

3. In an apparatus of the general nature of that herein described, in combination, a projector, said projector comprising mounting means, a casing mounted by means of a universal joint on said mounting means, a light source in said casing, a reflector located to the rear of said light source, a color filter positioned immediately in front of said light source, a bi-convex lens positioned in front of said color filter, a plano-convex lens having corrugations formed on its convex side, said corrugations running substantially parallel with the transverse axis of the lens, positioned in front of said bi-convex lens, whereby the beam from said light source is projected in a fan-like sheet of substantially uniform thickness, a second projector comprising mounting means, a casing mounted on said mounting means by means of a universal joint, a light source in said casing, a reflector disposed behind said light source, a plano-convex lens adjustably mounted immediately in front of said light source, a color filter mounted immediately in front of said plano-convex lens, image forming means disposed immediately in front of said color filter and a movably mounted bi-convex lens disposed in front of said image forming means whereby a beam of light of predetermined cross section and color may be projected against said fan-like sheet of light.

4. In apparatus of the general nature of that herein described, in combination, a plurality of projectors located in relation to one another, means in each of said projectors to diffuse therefrom light beams of different colors, means associated with one of said projectors for projecting one of said beams in a fan-like sheet, means forming an image positioned in another of said projectors, said last-mentioned means being distorted and so arranged and shaped as to appear reversed when projected upon said fan-like sheet when viewed from the side of said last-mentioned projector, said last-mentioned projector beam and said fan-like sheet forming an angle whereby one edge of said last-mentioned beam travels farther than the other edge thereof, said distortion of said image being such that one side of said image is larger than the other, the larger side of said image being projected the shortest distance to said fan-like sheet and the smaller side of said image the longest distance to said fan-like sheet whereby said distortion is rectified.

5. In apparatus of the general nature of that herein described, in combination, a projector adapted to throw light into the air in a segmental sheet of substantially uniform cross-section including a source of light and a lens having regular corrugations formed on one surface thereof, said corrugations running substantially parallel with the transverse axis of said lens, and a projector adapted to project a beam of light to intersect with said sheet and of different color from said sheet, said second mentioned projector comprising a light source, a condenser lens and an object lens, both of said lenses movable with respect to each other and to said light source.

6. In apparatus of the general nature of that herein described, in combination, a projector adapted to throw light in a fan-like sheet of substantially uniform thickness including a plano-convex lens having corrugations formed on its convex side, said corrugations running substantially parallel to the transverse axis of the lens, and a second projector adapted to throw an image against the beam from the said first-mentioned projector, said second projector including a light source, a condenser lens disposed immediately in front of said light source, image-forming means disposed in front of said condenser lens, and an objective lens, said image forming means having a distorted image thereon, said distortion being such as to be rectified when thrown against said beam from said first-mentioned projector.

7. In apparatus of the general nature of that herein described, in combination, a projector adapted to throw light in a fan-like sheet of substantially uniform thickness including a plano-convex lens having corrugations formed on its convex side, said corrugations running substantially parallel to the transverse axis of the lens, and a second projector adapted to throw an image against the beam from the said first-mentioned projector, said second projector including a light source, a condenser lens disposed immediately in front of said light source, the axes of said sheet and the beam forming said image being oblique, and a translucent object having formed thereon an image larger on one side than on the other side, said larger side being located on the side of said beam furthermost from said sheet.

8. In an apparatus of the general nature of that herein described, in combination, a projector, said projector comprising mounting means, a casing mounted by means of a universal joint on said mounting means, a light source in said casing, a reflector located to the rear of said light source, a color filter positioned immediately in front of said light source, a bi-convex lens positioned in front of said color filter, a plano-convex lens having corrugations formed on its convex side, said corrugations running substantially parallel with the transverse axis of the lens, positioned in front of said bi-convex lens, whereby the beam from said light source is projected in a fan-like sheet of substantially uniform thickness, a second projector comprising mounting means, a casing mounted on said mounting means by means of a universal joint, a light source in said casing, a reflector disposed behind said light source, a plano-convex lens adjustably mounted immediately in front of said light source, a color filter mounted immediately in front of said plano-convex lens, image forming means disposed immediately in front of said color filter, said image forming means comprising a stencil cut in distorted form, the image formed thereon being larger on one side than on the other side, said larger side being located at the top of said image, and a movably mounted bi-convex lens disposed in front of said image forming means whereby a beam of light of predetermined cross section and color may be projected against said fan-like sheet of light and superpose thereon the image of said image forming means, the distortion of said image being rectified by the angle of incidence of said light beam and said fan-like sheet of light.

ALFRED B. GAUTHIER.